United States Patent
Ooi et al.

(10) Patent No.: US 9,910,771 B2
(45) Date of Patent: *Mar. 6, 2018

(54) NON-VOLATILE MEMORY INTERFACE

(71) Applicant: Intel Corporation, Santa Clara, CA (US)

(72) Inventors: Eng Hun Ooi, Georgetown (MY); Robert J. Royer, Jr., Portland, OR (US); Michael W. Williams, Folsom, CA (US); Jeffrey R. Wilcox, El Dorado Hills, CA (US); Ritesh B. Trivedi, Folsom, CA (US); Blaise Fanning, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,732

(22) Filed: Jan. 2, 2017

(65) Prior Publication Data

US 2017/0212832 A1    Jul. 27, 2017

Related U.S. Application Data

(63) Continuation of application No. 14/128,669, filed as application No. PCT/IB2013/002080 on Jul. 26, 2013, now Pat. No. 9,535,829.

(51) Int. Cl.
*G06F 13/12* (2006.01)
*G06F 13/38* (2006.01)
(Continued)

(52) U.S. Cl.
CPC ........ *G06F 12/0246* (2013.01); *G06F 3/0679* (2013.01); *G06F 13/12* (2013.01);
(Continued)

(58) Field of Classification Search
None
See application file for complete search history.

(56) References Cited

U.S. PATENT DOCUMENTS 4,989,251 A * 1/1991 Mangold ................ G05B 19/04
                                                      381/314
5,293,495 A * 3/1994 Nguyen ................ G06F 13/362
                                                      370/438
(Continued)

FOREIGN PATENT DOCUMENTS

CN        103019970 A    4/2013
KR      20110051780 A    5/2011
(Continued)

OTHER PUBLICATIONS

English Translation of Russian Office Action, Patent Application No. 2015155902, dated Feb. 22, 2017, 2 pages.

(Continued)

*Primary Examiner* — Elias Mamo
(74) *Attorney, Agent, or Firm* — Compass IP Law PC

(57) ABSTRACT

In an embodiment, a memory interface may send an indication that a request is being sent. The indication may be sent to a non-volatile memory via a point-to-point bus between a memory interface and the non-volatile memory. The memory interface may send the request to the non-volatile memory via the bus. The request may include an address that may be used to identify a location for storing or reading data. The non-volatile memory may acquire the request from the bus and process the request. After processing the request, the non-volatile memory may send an indication to the memory interface that indicates the non-volatile memory has a response to send to the memory interface. The memory interface may grant access to the bus to the non-volatile memory. After being granted access to the (Continued)

bus, the non-volatile memory may send the response to the memory interface.

27 Claims, 13 Drawing Sheets

(51) Int. Cl.
 *G06F 12/02* (2006.01)
 *G06F 13/16* (2006.01)
 *G06F 3/06* (2006.01)
 *G06F 13/42* (2006.01)

(52) U.S. Cl.
 CPC .......... *G06F 13/16* (2013.01); *G06F 13/1668* (2013.01); *G06F 13/38* (2013.01); *G06F 13/4234* (2013.01); *G06F 12/02* (2013.01); *G06F 2212/7202* (2013.01)

(56) References Cited

U.S. PATENT DOCUMENTS

| | | | | |
|---|---|---|---|---|
| 5,649,209 | A * | 7/1997 | Umetsu | G06F 13/364 710/110 |
| 5,878,272 | A * | 3/1999 | Yanagisawa | G06F 13/28 710/2 |
| 6,643,723 | B1 * | 11/2003 | Heighway | H04L 29/06 370/249 |
| 2006/0218307 | A1 | 9/2006 | Dyke et al. | |
| 2007/0028031 | A1 | 2/2007 | Peterson et al. | |
| 2008/0172515 | A1 | 7/2008 | Croxford | |
| 2011/0022777 | A1 | 1/2011 | Moshayedi | |
| 2011/0219171 | A1 | 9/2011 | Kuehne et al. | |
| 2013/0073795 | A1 | 3/2013 | Hasegawa | |

FOREIGN PATENT DOCUMENTS

| | | |
|---|---|---|
| KR | 101108297 B1 | 1/2012 |
| WO | 2009067476 A3 | 7/2009 |
| WO | 2015011516 A1 | 1/2015 |

OTHER PUBLICATIONS

Extended European Search Report for Patent Application No. 13890241.6, dated Mar. 3, 2017, 9 pages.
International Preliminary Report on Patentability, PCT/IB2013/002080, dated Jan. 26, 2016, 6 pages.
International Search Report and Written Opinion for PCT Patent Application No. PCT/IB2013/002080, dated Apr. 11, 2014, 9 pages.
Organized Translation of "Notice of Reasons for Rejection" for Japanese Patent Application No. 2016-520749, dated Feb. 7, 2017, 1 page.
Notice of Allowance for RU Patent Application No. 2015155902 (PCT/IB2013/002080), dated May 24, 2017, 4 pages.
Notice of Allowance for U.S. Appl. No. 14/128,669, dated May 24, 2016, 7 pages.
Notice of Allowance for U.S. Appl. No. 14/128,669, dated Feb. 1, 2016, 7 pages.
Office Action for U.S. Appl. No. 14/128,669, dated Sep. 16, 2015, 10 pages.
Office Action for U.S. Appl. No. 14/128,669, dated Feb. 25, 2015, 11 pages.
Summary of KR Office Action for Patent Application No. 10-2015-7034230, dated May 18, 2017, 1 page.
English Translation of State Intellectual Property Office, P.R. China, Office Action, Patent Application No. 201380077745.1, dated Jun. 1, 2017, 24 pages.

\* cited by examiner

NON-VOLATILE MEMORY INTERFACE

This application is a continuation of earlier filed U.S. patent application Ser. No. 14/128,669 entitled "NON-VOLATILE MEMORY INTERFACE", filed on Dec. 23, 2013 which claims priority to PCT/IB2013/002080 filed on Jul. 26, 2013, the entire teachings of which are incorporated herein by this reference.

BACKGROUND

A computing device may include storage that may be used to store information. The information may include, for example, data and/or executable instructions. The storage may include a primary storage and a secondary storage. The primary storage may provide, for example, an internal storage for the processor. The secondary storage may provide, for example, an external storage for the processor. The processor may access the storage via one or more busses. The busses may be used to transfer information between the processor and the storage.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
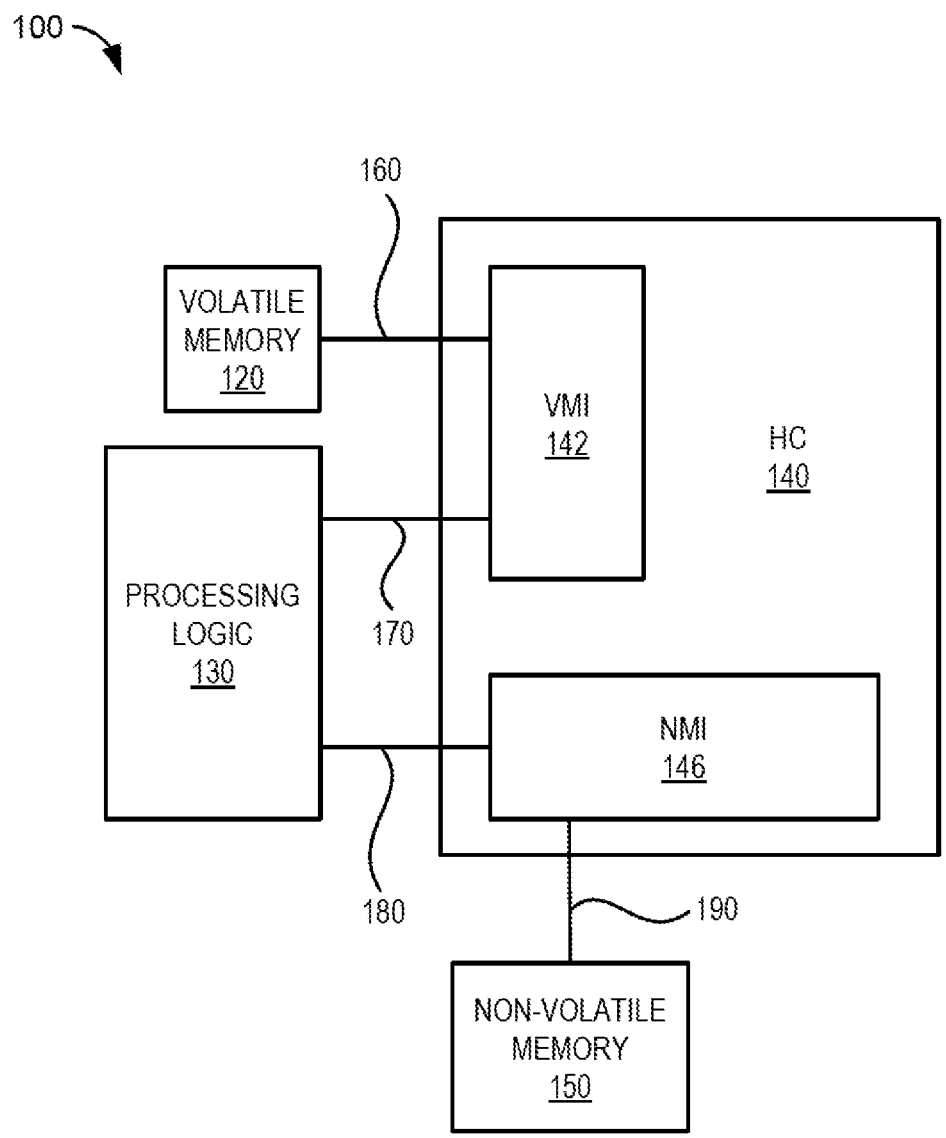
FIG. 1 illustrates a block diagram of an example of a computing device.

The following detailed description refers to the accompanying drawings. The same reference numbers in different drawings may identify the same or similar elements. Also, the following detailed description does not limit the invention.

A computing device may include storage that the computing device may use to store information (e.g., data, computer-executable instructions). The storage may be volatile and/or non-volatile. A volatile storage may be used to store information that may be lost after power is removed from the computing device. A non-volatile storage may be used to store information that is to survive (persist) after power is lost to the computing device.

For example, a computing device may contain a central processing unit (CPU) and storage. The storage may include, for example, a volatile memory and a non-volatile memory (NVM). The volatile memory may provide storage for information that may be lost after power is removed from the computing device. The NVM, on the other hand, may provide storage for information that is to persist after power is removed from the computing device. The CPU may retrieve the persisted information from the NVM after power is restored to the computing device.

A storage may contain one or more memory devices that may be used to store information. A memory device may comprise one or more arrays where an array may include one or more memory cells that may be used to store information in the memory device.

A memory cell may be associated with an address. The address may be used to identify the memory cell. Information may be written into and/or read from the memory cell using the address. For example, a memory cell in a memory device may be associated with a particular address (e.g., 0x100). A write transaction may specify the address and data to be written to the memory cell. The address may be used to identify the memory cell and the data may be written to the memory cell after it is identified.

A storage may be accessed (e.g., read, written) by issuing a command to a device that may contain the storage. The command may be part of a transaction that may be transferred to the device over a bus. Data associated with the command may also be transferred via the bus. The bus may include provisions (e.g., wires) for transferring the command and/or the data to the device.

For example, a computing device may include a CPU and an NVM. The CPU may be coupled to the NVM via a bus. The bus may be used to transfer commands and/or data between the CPU and the NVM. The bus may be, for example, a point-to-point bus that may include one or more wires that may be used to transfer the commands and/or data.

A storage may include one or more storage modules. The storage modules may contain one or more memory devices contained in the storage. Examples of storage modules may include, but are not limited to, dual in-line memory modules (DIMMs), secure digital (SD) cards, multimedia cards (MMC), CompactFlash (CF) cards, memory sticks, and single in-line memory modules (SIMMs).

Techniques described herein may be implemented in a computing device. Examples of computing devices that may implement techniques described herein may include, but are not limited to, smart phones, tablets, ultrabooks, laptops, mainframes, servers, and desktop computers.

FIG. 1 illustrates a block diagram of an example of a computing device 100 that may implement various techniques described herein. Referring to FIG. 1, computing device 100 may include various components such as, for example, volatile memory 120, processing logic 130, host controller (HC) 140, and non-volatile memory 150.

It should be noted that FIG. 1 illustrates an example embodiment of computing device 100. Other embodiments of computing device 100 may include more components or fewer components than the components illustrated in FIG. 1. Further, the components may be arranged differently than illustrated in FIG. 1. For example, an embodiment of computing device 100 may include a communications interface that may be used to communicate with a network, such as the Internet. Also, it should be noted that functions performed by various components contained in other embodiments of computing device 100 may be distributed among the components differently than as described herein.

Volatile memory 120 may provide storage for computing device 100. The storage may be used to store information, such as, for example, data and/or computer-executable instructions. The storage may be a high-speed storage that may implement, for example, a cache memory for computing device 100 (e.g., a level-2 (L2) cache). Volatile memory 120 may include one or more devices, such as, for example, memory devices that may be used to store the information.

Non-volatile memory 150 may also provide storage for computing device 100. The storage may be, for example, slower and have a higher storage capacity than volatile memory 120. The storage may be used to store information. The information may be stored on one or more devices contained in non-volatile memory 150. The devices may include, for example, one or more memory devices.

A volatile memory device may be a memory device that may lose information stored in the memory device when power is removed from the memory device. A non-volatile memory device may be a memory device that may retain information stored in the memory device when power is removed from the memory device. Examples of memory devices include dynamic RAM (DRAM) devices, flash memory devices, static RAM (SRAM) devices, zero-capacitor RAM (ZRAM) devices, twin transistor RAM (TTRAM) devices, read-only memory (ROM) devices, ferroelectric transistor RAM (FeTRAM) devices, magneto-resistive RAM (MRAM) devices, three dimensional (3D) cross point memory devices (e.g., phase change memory (PCM) devices), nanowire-based devices, resistive RAM (RRAM) devices, serial electrically erasable programmable ROM (SEEPROM) devices, spin transfer torque (STT) MRAM devices, and serial flash devices.

Processing logic 130 may include logic for interpreting, executing, and/or otherwise processing information. The information may be stored in, for example, volatile memory 120 and/or non-volatile memory 150. The information may include, for example, data and/or computer-executable instructions.

Processing logic 130 may include a variety of heterogeneous hardware. For example, the hardware may include some combination of one or more processors, microprocessors, field programmable gate arrays (FPGAs), application specific instruction set processors (ASICs), application specific integrated circuits (ASICs), complex programmable logic devices (CPLDs), graphics processing units (GPUs), and/or other types of processing logic that may, for example, interpret, execute, manipulate, and/or otherwise process the information. Processing logic 130 may comprise a single core or multiple cores.

Busses 160, 170, 180, and 190 may be point-to-point busses. The busses 160, 170, 180, and 190 may include electrical conductors (e.g., wires) that may be used to carry various signals between the components. The signals may include, for example, control signals and/or data. For example, bus 190 may be a point-to-point bus that may include a plurality of wires that may be used to carry signals between non-volatile memory interface (NMI) 146 and non-volatile memory 150. The signals may include various control signals and data. The signals may be carried by separate wires. For example, a first wire may be used to carry request and data information between the NMI 146 and the non-volatile memory. A second wire may be used to carry strobe information that may be used to acquire (e.g., read, receive) the request and data information. A third wire may be used to indicate whether the non-volatile memory 150 has been granted ownership of the first and second wires in order to transfer information from the non-volatile memory 150 to the NMI 146, and so on.

HC 140 may include logic that may enable information to be transferred between various components in computing device 100. The components may include, for example, volatile memory 120, processing logic 130 and/or non-volatile memory 150. Information may be transferred between the components via busses 160, 170, 180, and 190, which may couple the components with HC 140.

HC 140 may include logic that may be used as interfaces between various components in computing device 100. The interfaces may enable information to be exchanged (e.g., transferred) between the components. The interfaces may include, for example, a volatile memory interface (VMI) 142 and NMI 146. The VMI 142 may be used to interface processing logic 130 with volatile memory 120. The NMI 146 may be used to interface processing logic 130 with non-volatile memory 150.

VMI 142 may contain logic that may enable information to be communicated (e.g., transferred) between volatile memory 120 and processing logic 130 via busses 160 and 170. Specifically, VMI 142 may contain logic that may enable information to be communicated between VMI 142 and volatile memory 120 via bus 160. Moreover, VMI 142 may contain logic that may enable information to be communicated between processing logic 130 and VMI 142 via the bus 170. The information may include, for example, commands and/or data. Examples of logic that may be included in VMI 142 may include state machines, bus transceivers, registers, and/or other logic.

NMI 146 may contain logic that may enable information to be communicated between non-volatile memory 150 and processing logic 130 via busses 180 and 190. Specifically, NMI 146 may contain logic that may be used to communicate information between NMI 146 and processing logic 130 via bus 180. Moreover, NMI 146 may contain logic that may be used to communicate information between non-volatile memory 150 and NMI 146 via bus 190. Logic that may be contained in NMI 146 that may be included in NMI 146 may include, for example, state machines, bus transceivers, registers, and/or other logic.

The information may include, for example, requests and/or data. The requests may include command information (e.g., read command, write command) and/or address information (e.g., address to be read, address to be written). The information may be communicated using transactions.

A transaction may be used to communicate information between two entities over a bus. For example, information may communicated between NMI 146 and non-volatile memory 150 via bus 190 using transactions. Information communicated using a transaction may include, for example, request, data, and/or response information.

A transaction may be of a certain type. For example, a transaction may be a write transaction or a read transaction. A write transaction may be used, for example, to write information to storage, such as to non-volatile memory 150. A read transaction may be used, for example, to read information from storage, such as from non-volatile memory 150.

A transaction may include a number of phases. For example, a transaction may include a request phase, a data phase, and/or a response phase. A phase may be accompanied with certain types of information that may be transferred between entities during the phase. For example, during a request phase, command and/or address information may be transferred between the entities.

Figure 2:
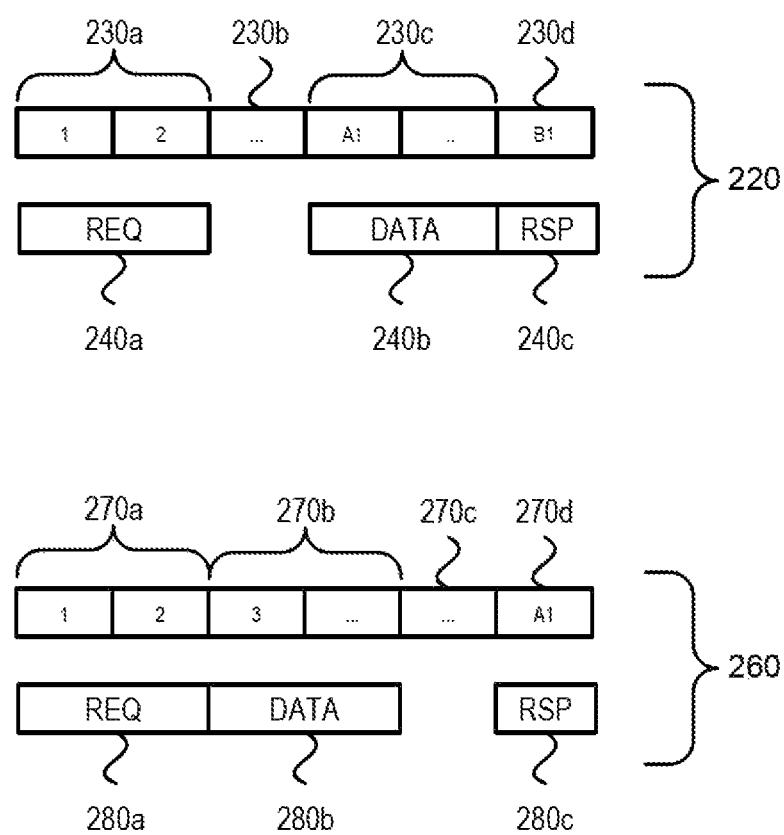
FIG. 2 illustrates examples of phases that may be associated with transactions.

FIG. 2 illustrates example phases that may be associated with a read transaction and a write transaction that may be transferred between entities, such as NMI 146 and non-volatile memory 150, via a bus, such as bus 190. Referring to FIG. 2, reference numeral 220 includes (1) a timeline and (2) information that may be transferred during the read transaction. Reference number 260 includes (1) a timeline and (2) information that may be transferred at phases that may be associated with the write transaction.

The read transaction may include a request phase, a data phase, and a response phase. The request phase may occur at time 230a. The request phase may include transferring a request 240a between the entities via the bus. The request 240a may include, for example, a preamble, a command, and/or an address. The command may identify an operation (in this example a read operation) that is to be performed. The address may identify a location that is to be read.

The preamble may be used to prepare to acquire the request 240a. Preparing may include, for example, using the preamble to train to acquire the request 240a from the bus. The preamble may include a predefined sequence of bits that may be used to perform the training.

For example, suppose the entities include NMI 146 and non-volatile memory 150, and the bus includes bus 190. During the request phase, request 240a may be sent from NMI 146 to non-volatile memory 150 via bus 190. The request 240a may include a preamble, command, and an address. The preamble may include a predefined sequence of bits that may be used by the non-volatile memory 150 to prepare to receive the command and address from bus 190. The command may identify a read operation that is to be performed by the non-volatile memory 150. The address may identify a location in the non-volatile memory 150 that is to be read.

The data phase may begin after the request phase. The data phase may include a time 230b where an entity may process the request. For example, during the data phase, the non-volatile memory 150 may process the above request. Here, processing may include, for example, reading data 240b from the non-volatile memory 150 at the location identified by the address.

The data phase may also include a time 230c when the data 240b is transferred between the entities. For example, after reading the data 240b, the data 240b may be transferred via bus 190 from the non-volatile memory 150 to the NMI 146.

At time 230d, the request may enter the response phase. The response phase may include sending a response 240c to the request. The response 240c may provide an indication that the request has been processed. The response 240c may be preceded by a preamble that may be used to prepare to acquire the response 240c. The preamble may be used to prepare to acquire the response 240c. Preparing may include, for example, using the preamble to train to acquire the response 240c from the bus. The preamble may include a predefined sequence of bits that may be used to perform the training.

For example, during the response phase a response 240c and preamble may be sent from the non-volatile memory 150 via the bus 190 to the NMI 146. The response 240c may provide an indication to the NMI 146 that the request has been processed by the non-volatile memory 150. The response 240c may include, for example, a status that may be associated with the read request. The status may indicate whether a read operation performed at the non-volatile memory 150 was performed successfully. The response 240c may be preceded by the preamble. NMI 146 may use the preamble to prepare to receive the response 240c from bus 190. Preparing may include training, such as described above.

Referring now to reference numeral 260, the write transaction may also include a request phase, a data phase, and a response phase. At time 270a, the request phase may include a request 280a. The request 280a may contain, for example, a preamble, a command, and/or an address. The preamble may be used to receive the command and/or address. The command may indicate that a write operation is to be performed and the address may identify a location where data is to be written.

For example, suppose the entities include NMI 146 and non-volatile memory 150, and the bus includes bus 190. During the request phase, request 280a may be sent from NMI 146 to non-volatile memory 150 via bus 190. The request 280a may include a preamble, command, and an address. The preamble may be used by the non-volatile memory 150 to prepare to receive the command and address. Preparing may include training, such as described above. The command may identify a write operation that is to be performed by the non-volatile memory 150. The address may identify a location in the non-volatile memory 150 that is to be written.

The data phase may occur after the request phase. During the data phase, data 280b to be written may be transferred between the entities, as indicated at time 270b. Also, during the data phase, at time 270c, the data may be written to the location identified, for example, in the request 280a.

For example, during the data phase data 280b may be transferred from the NMI 146 to the non-volatile memory 150 via bus 190. After receiving the data 280b, non-volatile memory 150 may write the data to a location in non-volatile memory 150 that may be identified using the address contained in request 280a.

The response phase may follow the data phase as indicated at time 270d. During the response phase, a response 280c may be transferred between the entities. The response 280c may include, for example, a status associated with the write request. The status may indicate, for example, whether the write request was successfully completed.

For example, non-volatile memory 150 may generate response 280c that may contain a status that may indicate whether the write operation was successful. During the response phase, non-volatile memory 150 may transfer the response 280c via bus 190 to NMI 146.

Various signals may be transferred between the NMI 146 and the non-volatile memory 150 via bus 190. Bus 190 may be a connected bus (e.g., a point-to-point bus) and each of the signals may be carried, for example, on separate connections (e.g., electrically conductive wires, optical connections) that may be included in bus 190. The signals may include, for example, signals listed in the following table.

| Signal Name | Size | Direction | Description |
| --- | --- | --- | --- |
| DQ | 8 or 16 | Bidirectional | Data |
| DQS | 2 or 4 | Bidirectional | Data strobe differential pair |
| ACT | 1 | Unidirectional from NMI to non-volatile memory | NMI transmission indication |
| RGRANT | 1 | Unidirectional from NMI to non-volatile memory | NMI grants DQ and DQS ownership to non-volatile memory |
| RQRDY | 1 | Unidirectional from NMI to non-volatile memory | NMI request ready |
| RRDY | 1 | Unidirectional from non-volatile memory to NMI | Non-volatile memory response ready |

Note that the above table provides examples of signals that may be transferred between NMI 146 and non-volatile memory 150. Other signals may also be transferred between NMI 146 and non-volatile memory 150 via, for example, bus 190. These signals may include, for example, a signal that may be used to reset an operation of the NMI 146 and/or non-volatile memory 150, a signal that may provide a reference for impedance calibration and/or check bit signals that may provide error detection and/or correction of information transferred, for example, over bus 190.

Still other signals may include, for example, signals that may be used for power management. For example, a signal that may be included that may be used by the NMI 146 to direct the non-volatile memory 150 to enter into a low power state. Another signal may be included that may be used, for example, by the NMI 146 to direct the non-volatile memory 150 to exit a low power state.

Note that wires that carry signals over bus 190 may be repurposed to carry certain signals based on, for example, a state of non-volatile memory 150 and/or NMI 146. For example, wires carrying ACT and RRDY may be repurposed for use in managing a power state associated with non-volatile memory 150, such as described above.

Figure 3:
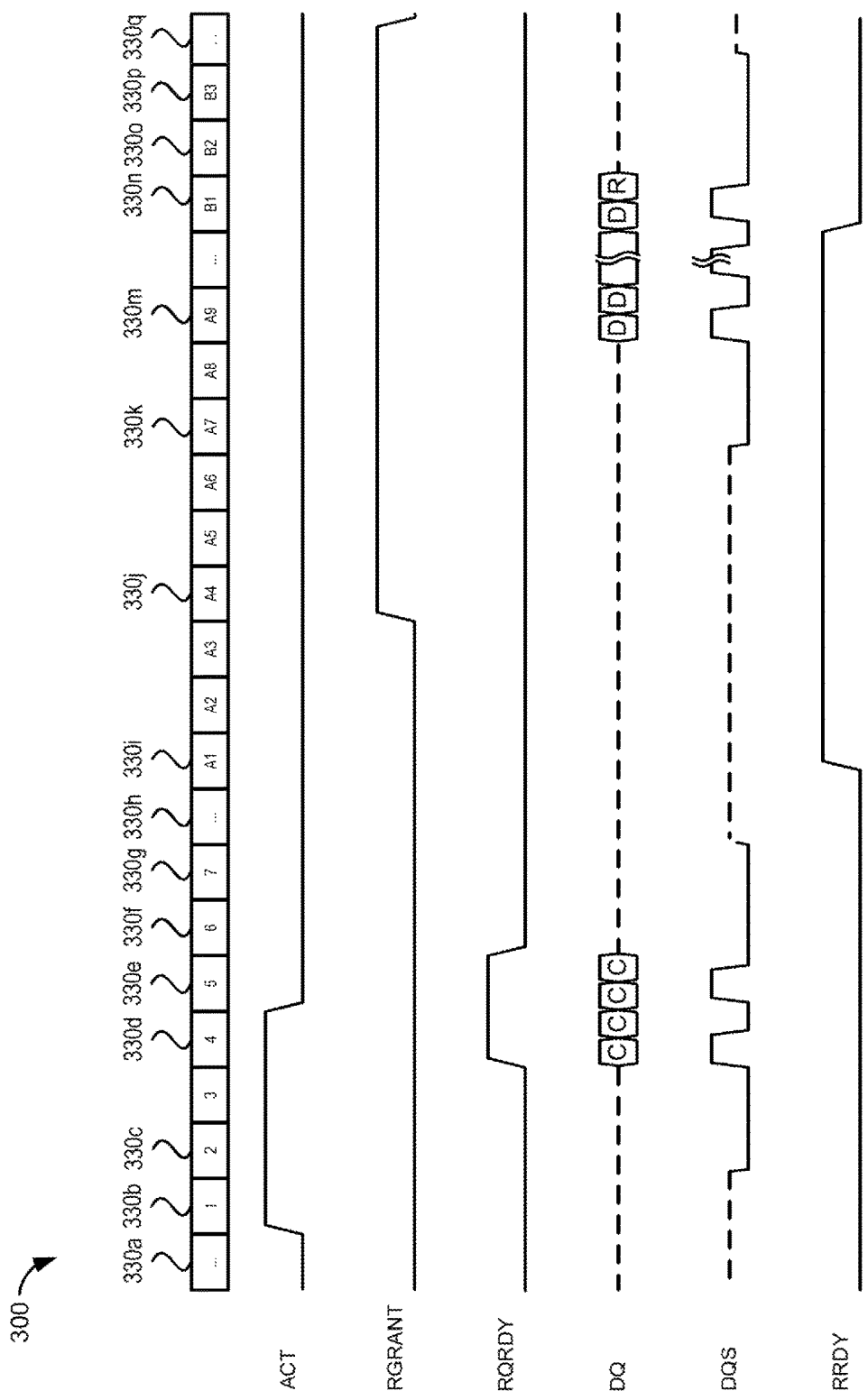
FIG. 3 illustrates an example of a timing diagram that may be associated with a read transaction.

Signals transferred between non-volatile memory 150 and NMI 146 may be asserted and deasserted at various times to provide various indications during a transaction. FIG. 3 illustrates a timing diagram 300 of an example operation of signals during a read transaction between, for example, NMI 146 and non-volatile memory 150. The signals may be transferred between non-volatile memory 150 and the NMI 146 via bus 190.

Referring to FIG. 3, time 330*a* may represent a state of the signals prior to the read transaction. Specifically, at time 330*a*, the above-described ACT, RGRANT, RQRDY, and RRDY signals may be deasserted. In addition, the above-described DQ and DQS may be in a high-impedance state, as indicated by broken lines in diagram 300.

At time 330*b*, NMI 146 may assert the ACT signal to indicate to the non-volatile memory 150 that the NMI 146 has a request to send. Asserting ACT may indicate a request phase of the read transaction has been entered. Non-volatile memory 150 may detect that ACT is asserted and prepare to receive a preamble associated with the request on DQS. At time 330*c*, NMI 146 may begin to transfer the preamble on DQS. Non-volatile memory 150 may receive the preamble and prepare to receive the request from NMI 146. Preparing may include training, such as described above.

At times 330*d* and 330*e*, NMI 146 may transfer the request onto DQ. In addition, NMI 146 may provide a strobe signal on DQS that the non-volatile memory 150 may use to acquire the request from DQ. Non-volatile memory 150 may acquire the strobe signal and use the strobe signal use to acquire the request from DQ during times 330*d* and 330*e*.

At time 330*e*, NMI 146 may deassert RQRDY. Non-volatile memory 150 may detect that NMI 146 has deasserted RQRDY and discontinue acquiring the request from DQ. Moreover, at times 330*f* and 330*g*, NMI 146 may transfer a post-amble over DQS to the non-volatile memory 150. The non-volatile memory 150 may acquire the post-amble and determine that the request phase has been exited.

At time 330*h*, non-volatile memory 150 may process the request. Here, processing may include determining the request is a read request and reading data from the non-volatile memory 150 at a location identified in the request.

After the data is read, non-volatile memory 150 may assert RRDY, as indicated at time 330*i*, to indicate to the NMI 146 that non-volatile memory 150 is ready to send information to the NMI 146. The information may include, for example, data that was read from the non-volatile memory 150. Here, asserting RRDY may indicate entering a data phase of the read transaction.

NMI 146 may determine that RRDY has been asserted and assert RGRANT to send an indication to non-volatile memory 150 that ownership of DQ has been granted, as indicated at time 330*j*.

After detecting that RGRANT has been asserted and determining based on RGRANT being asserted that the non-volatile memory 150 has been granted ownership of DQ, the non-volatile memory 150 may begin transferring a preamble on DQS as indicated at time 330*k*. NMI 146 may acquire the preamble and prepare to receive the data on DQ. Preparing may include training, such as described above. At times 330*m* and 330*n*, the non-volatile memory 150 may transfer the data and associated strobe information onto DQ and DQS, respectively. NMI 146 may use the strobe information to acquire the data from DQ.

At time 330*o*, non-volatile memory 150 may deassert RRDY to indicate that the data phase has been exited and that a response phase of the read transaction has been entered. After deasserting RRDY, the non-volatile memory 150 may transfer response information on DQ. The response information may include, for example, a status associated with the request. The status may indicate, for example, whether the request was successfully processed by the non-volatile memory 150. NMI 146 may acquire the response information from DQ and process it. Here, processing may include, for example, determining whether the request was successfully processed by the non-volatile memory 150.

At times 330*o* and 330*p*, the non-volatile memory 150 may transfer a post-amble onto DQS. NMI 146 may acquire the post-amble and determine that the response phase has been exited. After determining the response phase has been exited, NMI 146 may deassert the RGRANT signal, as indicated at time 330*q*.

Figure 4:
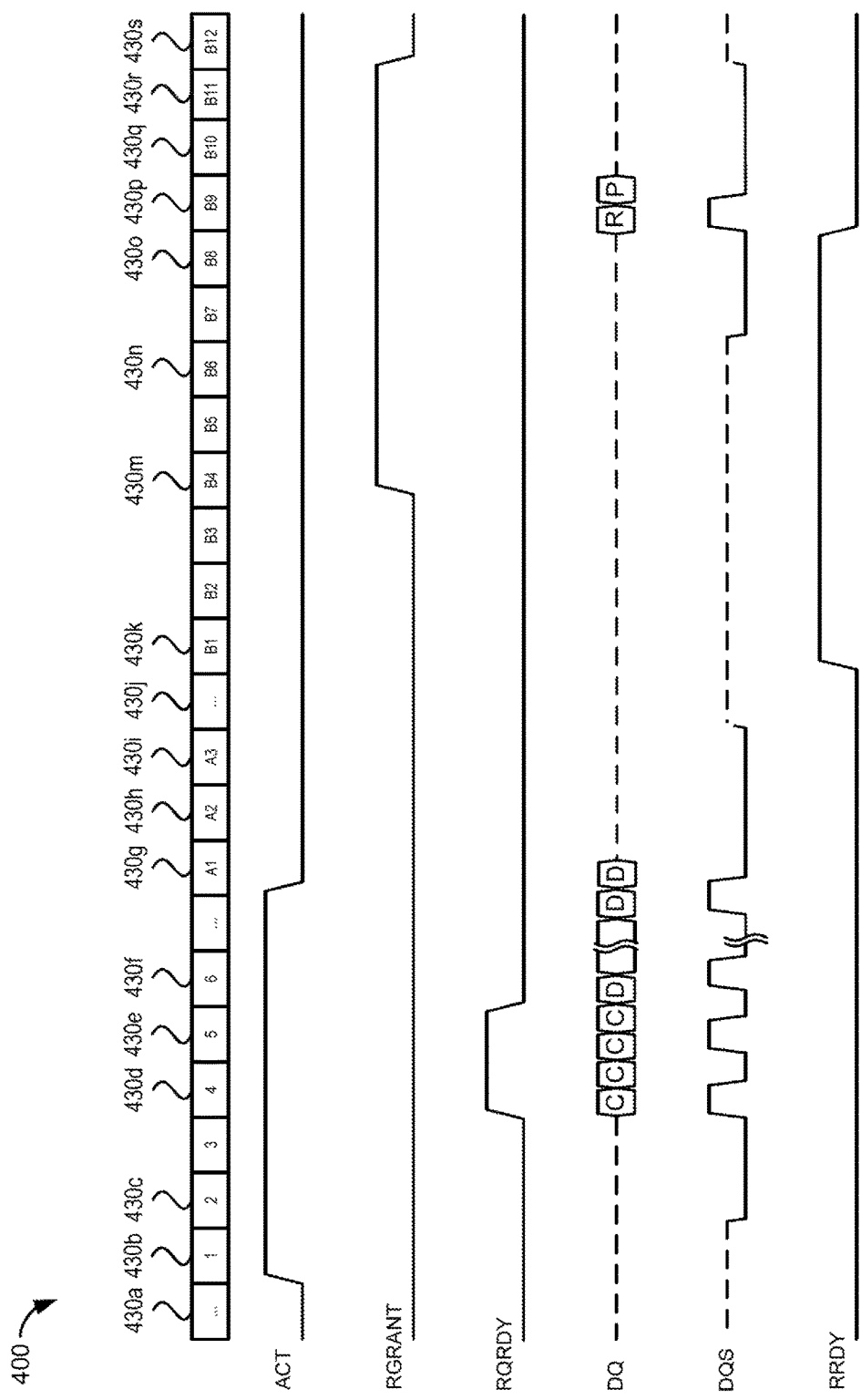
FIG. 4 illustrates an example of a timing diagram that may be associated with a write transaction.

FIG. 4 illustrates a timing diagram 400 of an example operation of signals during a write transaction between, for example, NMI 146 and non-volatile memory 150. The signals may be transferred between NMI 146 and non-volatile memory 150 via bus 190.

Referring to FIG. 4, time 430*a* may represent a state of the signals prior to the write transaction. Specifically, at time 430*a*, the above-described ACT, RGRANT, RQRDY, and RRDY signals may be deasserted. In addition, the above-described DQ and DQS may be in a high-impedance state, as indicated by broken lines in diagram 400.

At time 430*b*, NMI 146 may assert the ACT signal to indicate to the non-volatile memory 150 that the NMI 146 has a request to send. Asserting ACT may indicate a request phase of the write transaction has been entered. Non-volatile memory 150 may detect that ACT is asserted and prepare to acquire a preamble associated with the request on DQS. At time 430*c*, NMI 146 may begin to transfer the preamble on DQS. Non-volatile memory 150 may acquire the preamble and prepare to acquire the request from NMI 146. Preparing may include training using the preamble, such as described above.

At times 430*d* and 430*e*, NMI 146 may transfer the request onto DQ. The request may include a command and an address. The command may identify the request as a write request and the address may identify a location in non-volatile memory 150 that is to be written with data. NMI 146 may provide a strobe signal on DQS that the non-volatile memory 150 may use to acquire the request from DQ.

Non-volatile memory 150 may receive the strobe signal and use the strobe signal to acquire the request from DQ during times 430*d* and 430*e*.

At time 430*f*, NMI 146 may deassert RQRDY. Non-volatile memory 150 may detect that NMI 146 has deasserted RQRDY and discontinue acquiring the request from DQ. Note that RQRDY may be asserted for a time that the request is being transferred onto DQ by the NMI 146 and is deasserted at a time when DQ does not contain request information. Non-volatile memory 150 may detect that DQ is no longer asserted and determine that the request phase of the write transaction has been exited and the transaction is entering a data phase.

Also at time 430*f*, NMI 146 may transfer data onto DQ. The non-volatile memory 150 may acquire the data from DQ using a strobe that may be provided on DQS by NMI 146. The data may include data to be written in the non-volatile memory 150. At time 430*g*, NMI 146 may complete transferring the data onto DQ.

At time 430*g*, NMI 146 may deassert ACT which may indicate that the NMI 146 no longer has ownership of DQ. After deasserting ACT, NMI 146 may transfer a post-amble onto DQS, as indicated at times 430*g* and 430*h*. The non-volatile memory 150 may acquire the post-amble and determine that the data phase of the write transaction has been exited.

At time 430*j*, non-volatile memory 150 may write the data to a location in the non-volatile memory 150 that may be identified by an address that was specified by the request. Afterwards, at time 430*k*, non-volatile memory 150 may assert RRDY to indicate to the NMI 146 that the non-volatile memory 150 is ready to send a response. At this point, the write transaction may enter the response phase.

The NMI 146 may detect that RRDY is asserted and at time 430*m*, may grant ownership of DQ to the non-volatile memory 150 by asserting RGRANT. Non-volatile memory 150 may detect that RGRANT is asserted and determine that the non-volatile memory 150 has been granted ownership of DQ. At times 430*n* and 430*o* non-volatile memory 150 may transfer a preamble onto DQS. NMI 146 may acquire the preamble and prepare to acquire a response on DQ. Preparing may include training, such as described above.

At time 430*p*, the non-volatile memory 150 may transfer the response onto DQ. In addition, at time 430*q*, non-volatile memory 150 may send padding information on DQ (indicated in diagram 400 as "P"). The padding information may be used to "pad out" the response to a certain length (e.g., a certain number of bytes).

NMI 146 may use strobes provided on DQS by non-volatile memory 150 to acquire the response and padding information on DQ. NMI 146 may process the response. Here, processing may include, for example, determining whether the response has indicate the request was performed successfully.

At times 430*q* and 430*r*, non-volatile memory 150 may send a post-amble on DQS. NMI 146 may receive the post-amble and determine that the response phase of the write transaction has been exited. Afterwards, at time 430*s*, NMI 146 may deassert RGRANT to indicate that the non-volatile memory 150 no longer has ownership of DQ.

In computing device 100 (FIG. 1), NMI 146 may be considered a host to non-volatile memory 150 and non-volatile memory 150 may be considered a client of NMI 146. This relationship may be established, for example, based on which entity may control ownership of DQ. As described above, the NMI 146 may take ownership of DQ without requesting ownership first. Non-volatile memory 150, on the other hand, asserts RRDY to request ownership of DQ and waits until the NMI 146 grants ownership before the non-volatile memory 150 takes ownership of DQ. It may be said that NMI 146 controls which entity has ownership of DQ. Thus, based on this behavior, it may be said that NMI 146 is a host to non-volatile memory 150 which is a client of NMI 146.

Communication between NMI 146 and non-volatile memory 150 via bus 190 may follow a protocol. The protocol may be subject to one or more rules. For example, the protocol may be subject to one or more of the following rules:

1) RRDY assertion by non-volatile memory 150 may depend on RGRANT being sampled by non-volatile memory 150 as being deasserted;
2) RGRANT assertion by NMI 146 may depend on RRDY being sampled by NMI 146 as being asserted along with ACT and RQRDY being deasserted. Minimum assertion duration may be for a predetermined number of clock cycles of a clock associated with the NMI 146 (NMI clock). For example, NMI 146 may assert RGRANT for a minimum of two clock cycles of the NMI clock;
3) The non-volatile memory 150 may start transmitting a preamble on DQS after sampling RGRANT assertion for a predetermined number of clock cycles of a clock associated with the non-volatile memory 150 (non-volatile memory clock). For example, non-volatile memory 150 may start transmitting a preamble on DQS after sampling RGRANT assertion for one clock cycle of the non-volatile memory clock;
4) RGRANT may be deasserted by NMI 146 before RRDY is deasserted. Alternatively, RGRANT may be deasserted after the NMI 146 detects RRDY has been deasserted;
5) RRDY deassertion may occur after a transaction has completed or in response to NMI 146 regaining bus ownership before a transaction has completed;
6) NMI 146 may begin sending a preamble on DQS after sampling RRDY as being deasserted for a predetermined number of NMI clock cycles (e.g., one NMI clock cycle). A predetermined time after the preamble is sent, NMI 146 may begin sending information on DQ;
7) After RGRANT is sampled as deasserted by non-volatile memory 150, RRDY may be deasserted by non-volatile memory 150. In addition, non-volatile memory 150 may end transmitting information on DQ and DQS. Transmission of the information may be ended on a particular boundary associated with the information (e.g., a 64-byte boundary). Deassertion of RRDY may indicate, for example, an end of transmission by the non-volatile memory 150;
8) RQRDY assertion may envelope information transmitted on DQ by NMI 146. For example, RQRDY assertion may envelope command information transmitted on DQ by NMI 146 in a read transaction;
9) RQRDY may be deasserted for a predetermined duration (e.g., for two NMI clocks). If request phases are back-to-back, RQRDY may remain asserted and not be deasserted between the phases;
10) NMI 146 may tri-state DQ and/or DQS after a read transaction's request phase has completed and/or after a write transaction's data phase;
11) ACT assertion may depend on RGRANT and RRDY being de-asserted; and/or 12) Deassertion of ACT may occur after a predetermined number of NMI clock cycles. For example, deassertion of ACT may occur after one clock cycle of the NMI clock.

Figure 5A:
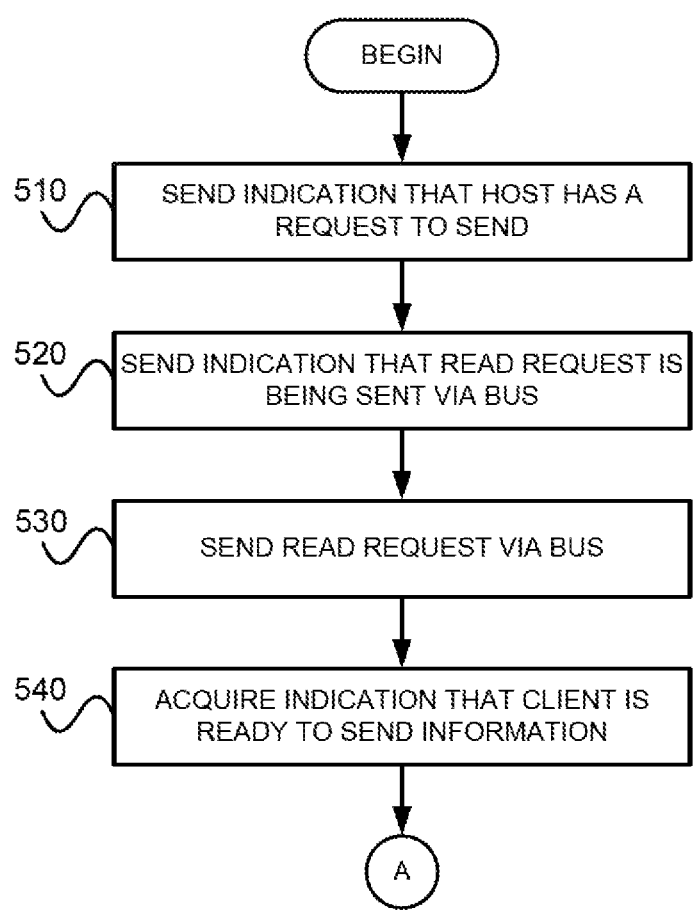
FIGS. 5A-B illustrate a flow diagram of example acts that may be performed by a host during a read transaction.
Figure 5B:
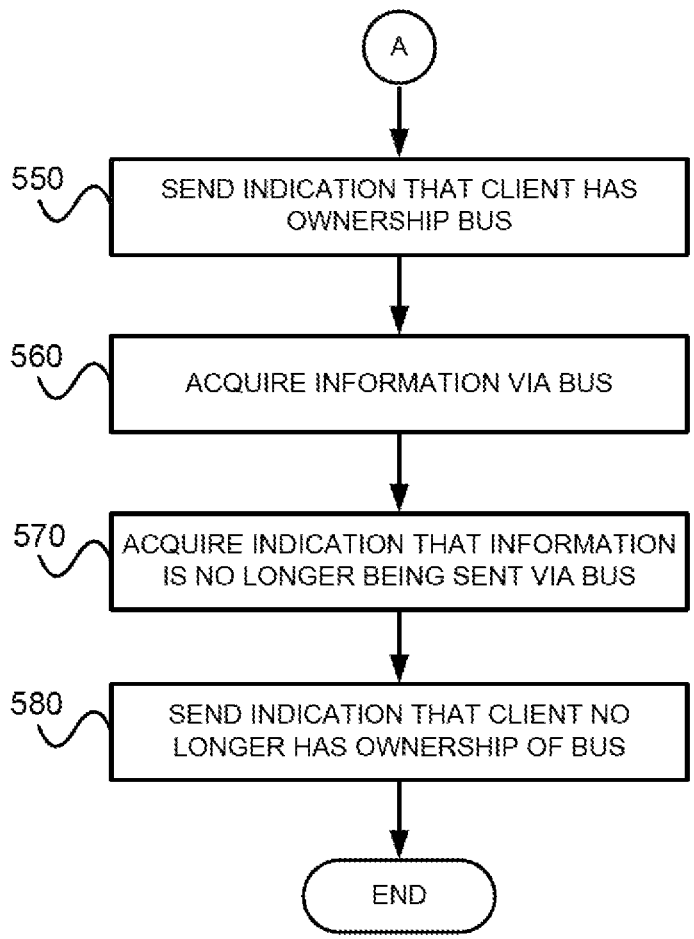

FIGS. 5A-B illustrate a flow diagram of example acts, associated with a read transaction, that may be performed by a host, such as, for example, NMI 146. Referring to FIG. 5A, at block 510, an indication may be sent to a client that the host has a request to send. For example, suppose the host is NMI 146 and the client is non-volatile memory 150. At block 510, NMI 146 may assert ACT to indicate to non-volatile memory 150 that the NMI 146 has a request to send to the non-volatile memory 150.

At block 520, an indication is sent to the client where the indication indicates that a read request is being sent via bus. For example, NMI 146 may assert RQRDY to indicate to non-volatile memory 150 that a read request is being sent to non-volatile memory 150 on DQ. At block 530, a read request may be sent to the client via the bus. For example, NMI 146 may send the read request to non-volatile memory 150 via DQ.

At block 540, an indication that the client is ready to send information may be acquired. For example, the non-volatile memory 150 may receive the read request and process it. Processing may include, for example, reading data from a location in the non-volatile memory 150 where the location may be identified based on an address that may be contained in the read request. After the data is read, non-volatile memory 150 may assert RRDY to indicate that the non-volatile memory 150 is ready to send the data to the NMI 146.

At block 550 (FIG. 5B), an indication that the client has ownership of the bus may be sent. For example, NMI 146 may assert RGRANT to indicate to the non-volatile memory 150 that the non-volatile memory 150 has ownership of DQ. At block 560, information from the client may be acquired via the bus. For example, after detecting that that RGRANT has been asserted, non-volatile memory 150 may begin sending the data to NMI 146 via DQ and NMI 146 may read the data from DQ using, for example, a strobe signal sent by the non-volatile memory 150 on DQS. Moreover, non-volatile memory 150 may transfer response information to the NMI 146 via DQ and the NMI 146 may read the response information from DQ, such as described above.

At block 570, an indication may be acquired from the client that information is not longer being sent from the client to the host via the bus. For example, after sending the response information, the non-volatile memory 150 may send a post-amble on DQS. The post-amble may indicate information is not longer being sent on DQ by the non-volatile memory 150.

At block 580, an indication may be sent that indicates that the client no longer has ownership of the bus. For example, NMI 146 may deassert RGRANT to indicate to non-volatile memory 150 that the non-volatile memory 150 no longer has ownership of DQ.

Figure 6A:
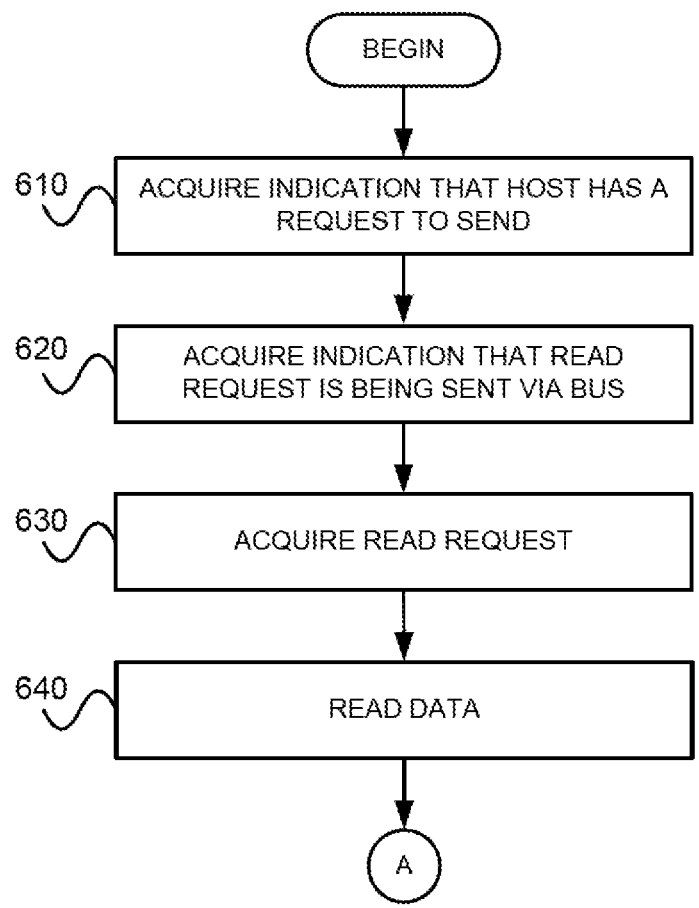
FIGS. 6A-B illustrate a flow diagram of example acts that may be performed by a client during a read transaction.
Figure 6B:
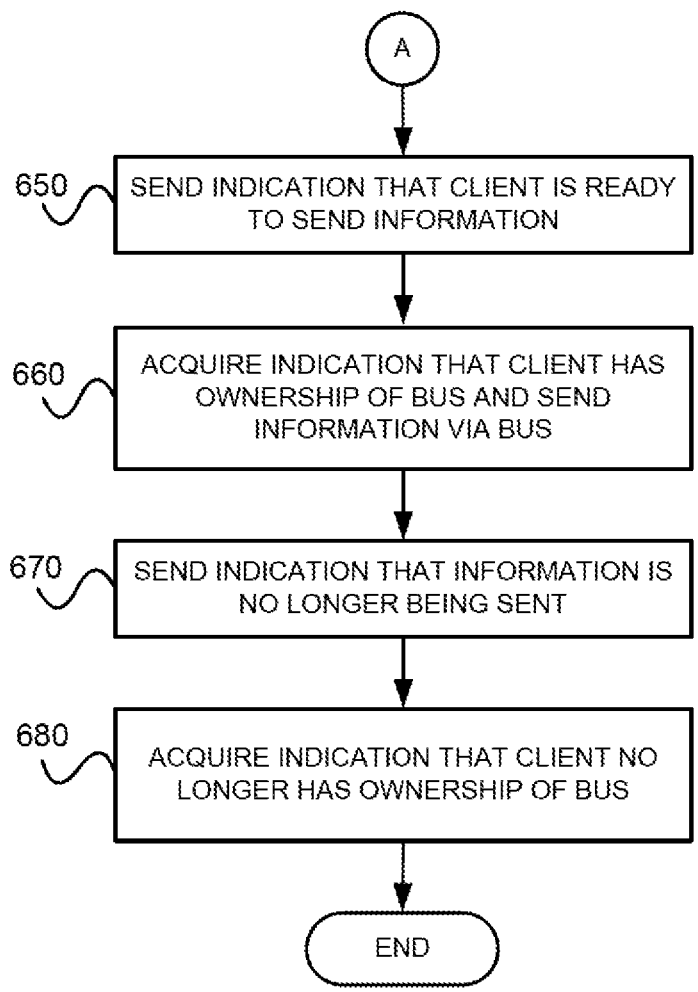

FIGS. 6A-B illustrate a flow diagram of example acts, associated with a read transaction, that may be performed by a client. Referring to FIG. 6A, at block 610, an indication may be acquired from a host that the host has a request to send to the client. For example, suppose the host is NMI 146 and the client is non-volatile memory 150. At block 610, NMI 146 may assert ACT to indicate that the NMI 146 has a request to send to non-volatile memory 150. Non-volatile memory 150 may detect that ACT is asserted and determine that the NMI 146 has a request to send to the non-volatile memory 150.

At block 620, an indication may be acquired from the host that a read request is being sent on the bus. For example, NMI 146 may assert RQRDY to indicate to non-volatile memory 150 that a read request is being sent on the DQ bus by the NMI 146. At block 630, the read request is acquired from the host via the bus. For example, non-volatile memory 150 may read the read request from DQ using, for example, a strobe signal sent by NMI 146 on DQS.

At block 640, data may be read based on the read request. For example, the read request may include an address. The non-volatile memory 150 may use the address to identify a location in the non-volatile memory 150 that contains the data. The non-volatile memory 150 may read the data from the identified location in the non-volatile memory 150.

At block 650 (FIG. 6B), an indication that the client is ready to send information may be sent. For example, after reading the data from the non-volatile memory 150, the non-volatile memory 150 may assert RRDY. NMI 146 may detect that RRDY has been asserted and determine that the non-volatile memory 150 is ready to send the requested data.

At block 660, an indication that the client has ownership of the bus may be acquired and information may be sent to the host via the bus. For example, NMI 146 may grant ownership of the DQ to the non-volatile memory 150 using RGRANT, as described above. After non-volatile memory 150 determines it has ownership of DQ, non-volatile memory 150 may send the data via DQ to the NMI 146, such as described above.

At block 670, an indication that the information is no longer being sent on the bus is sent. For example, the non-volatile memory 150 may send a post-amble to NMI 146 via DQS to indicate that information is no longer being sent on DQ.

At block 680, an indication may be acquired from the host that indicates that the client no longer has ownership of the bus. For example, NMI 146 may deassert RGRANT to indicate to non-volatile memory 150 that the non-volatile memory 150 no longer has ownership of DQ.

Figure 7A:
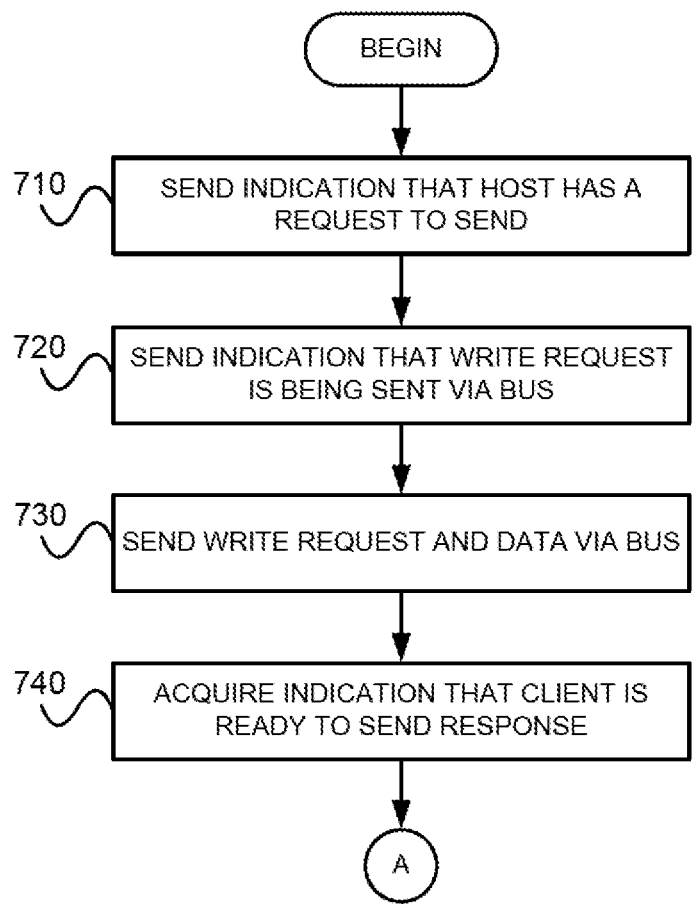
FIGS. 7A-B illustrate a flow diagram of example, acts that may be performed by a host during a write transaction.
Figure 7B:
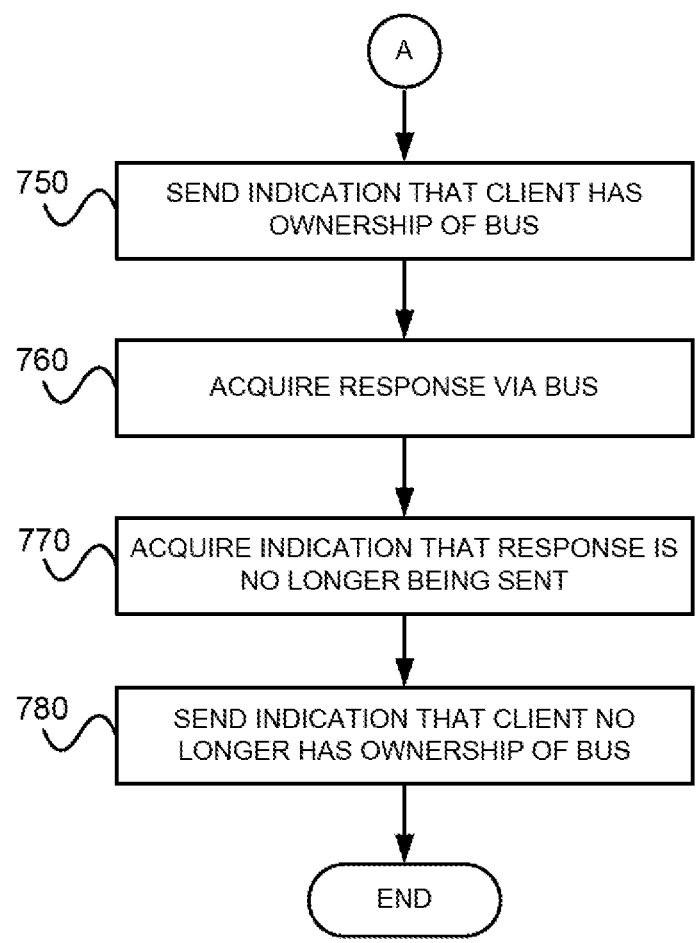

FIGS. 7A-B illustrate a flow diagram of example acts, associated with a write transaction, that may be performed by a host. Referring to FIG. 7A, at block 710, an indication that the host has a request to send may be sent. For example, suppose the host is NMI 146 and the client is non-volatile memory 150. At block 710, NMI 146 may assert ACT to indicate to non-volatile memory 150 that the NMI 146 has a request to send to the non-volatile memory 150. Non-volatile memory 150 may detect that ACT is asserted and determine that the NMI 146 has a request to send.

At block 720, an indication that the request is being sent via the bus is sent. For example, NMI 146 may assert RQRDY to indicate to the non-volatile memory 150 that the request is being sent on the QD. At block 730, the request and information to be written is sent via the bus. For example, after asserting RQRDY, NMI 146 may send the request to the non-volatile memory 150 via QD. After the request is sent, NMI 146 may deassert RQRDY. NMI 146 may then send data to be written to the non-volatile memory 150 via QD.

At block 740, an indication may be acquired where the indication may indicate that a response is ready to be sent to the host from the client. For example, after writing the data in the non-volatile memory 150, non-volatile memory 150 may assert RRDY to request access to QD to send a response to the NMI 146. NMI 146 may detect that RRDY is asserted and determine that the non-volatile memory 150 is ready to send a response.

At block 750 (FIG. 7B), an indication may be sent to the client that indicates that the client has been granted ownership of the bus. For example, after detecting RRDY is asserted, the NMI 146 may assert RGRANT to grant ownership of the bus to the non-volatile memory 150.

At block 760, a response may be acquired via the bus. For example, the non-volatile memory 150 may detect that RGRANT is asserted and determine that the NMI 146 has granted the non-volatile memory 150 ownership of QD. Non-volatile memory 150 may send the response to NMI 146 via QD. The NMI 146 may receive the response from the QD, such as described above.

At block 770, an indication may be acquired that the response is no longer being sent on the bus. For example, after sending the response, the non-volatile memory 150 may send a post-amble on QDS. NMI 146 may detect the post-amble and determine that the response is no longer being sent on the bus.

At block 780, an indication that the client no longer has ownership of the bus may be sent. For example, NMI 146 may deassert RGRANT to indicate to the non-volatile memory 150 that the non-volatile memory 150 no longer has ownership of DQ.

Figure 8A:
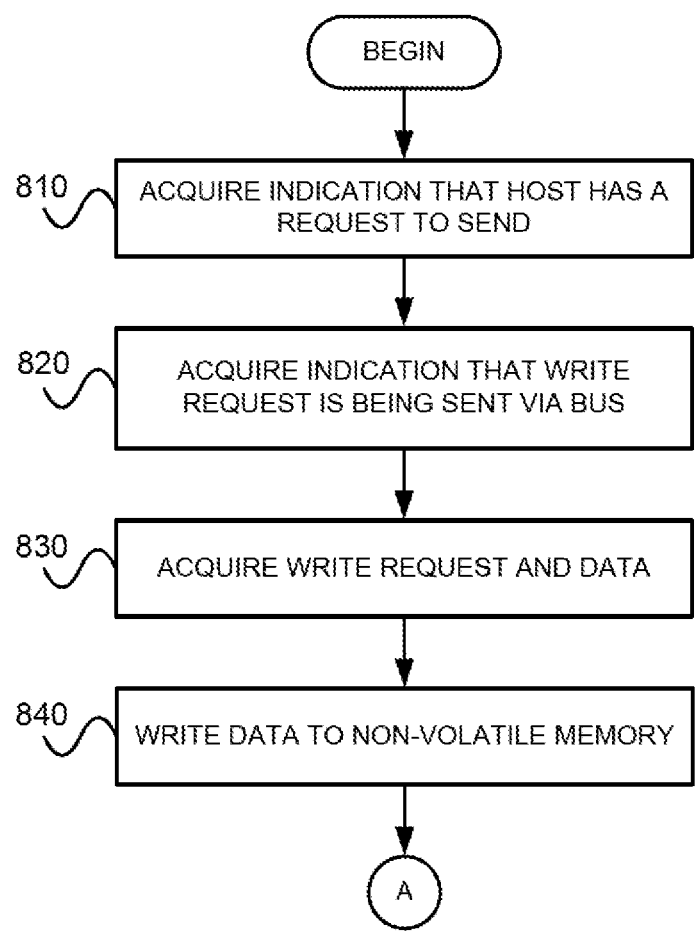
FIGS. 8A-B illustrate a flow diagram of example acts that may be performed by a client during a read transaction.
Figure 8B:
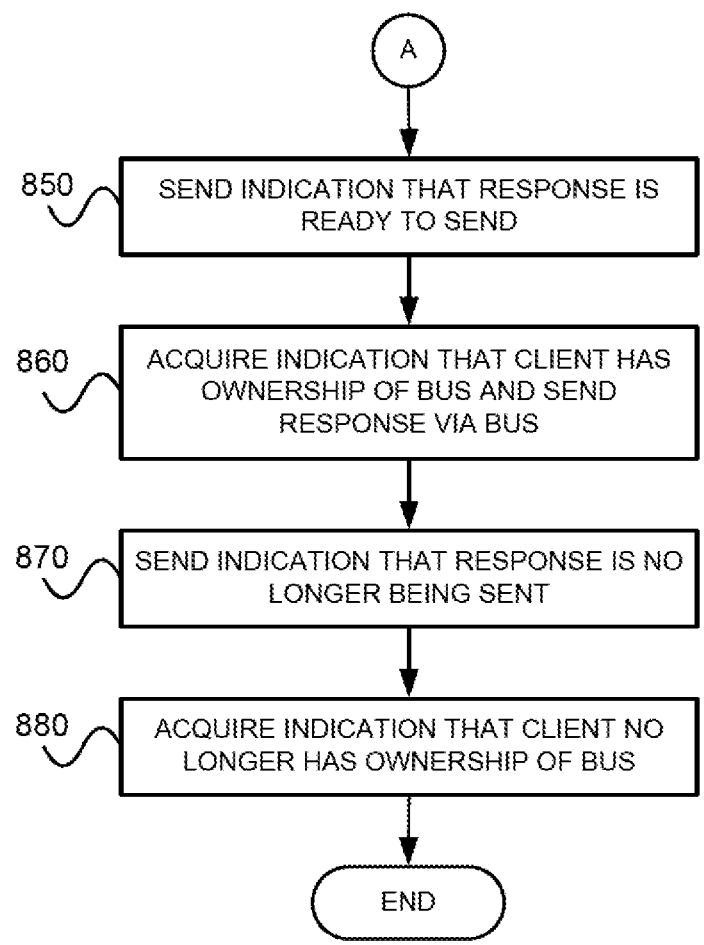

FIGS. 8A-B illustrate a flow diagram of example acts, associated with a write transaction, that may be performed by a client. Referring to FIG. 8A, at block 810, an indication that the host has a request to send may be acquired. For example, suppose the host is NMI 146 and the client is non-volatile memory 150. The NMI 146 may assert ACT to indicate that the NMI 146 has a request to send. The non-volatile memory 150 may detect that ACT is asserted and determine that the NMI 146 has a request to send.

At block 820, an indication that a write request is being sent via the bus may be acquired and, at block 830, the write request and data may be acquired. For example, the NMI 146 may assert RQRDY to indicate that a request is being sent on DQ. Non-volatile memory 150 may detect that RQRDY is asserted and read the request from DQ, such as described above. NMI 146 may deassert RQRDY to indicate, for example, that a command portion of the request has been sent and that the data portion of the request is being sent on QD. Non-volatile memory 150 may detect that RQRDY has been deasserted and read the data from DQ, such as described above.

At block 840, the data is written to the non-volatile memory. For example, after acquiring the request, non-volatile memory 150 may process the request. Here, processing may include determining the request is a write request. Non-volatile memory 150 may also identify a location in non-volatile memory 150 to be written based on an address that may be contained in the request. After reading the data from DQ, the non-volatile memory 150 may write the data to the identified location in the non-volatile memory 150.

At block 850 (FIG. 8B), an indication may be sent that indicates that a response to the write request is ready to be sent. For example, non-volatile memory 150 may assert RRDY to indicate that the non-volatile memory 150 has a response to send via DQ. NMI 146 may detect that RRDY has been asserted and determine that the non-volatile memory 150 has a response to send.

At block 860, an indication may be acquired where the indication may indicate that ownership of the bus has been granted to the client. In addition, at block 860 a response may be sent by the client to the host. For example, after NMI 146 determines that non-volatile memory 150 has a response to send, NMI 146 may assert RGRANT to grant ownership of DQ to non-volatile memory 150. Non-volatile memory 150 may detect that RGRANT has been asserted and determine that the non-volatile memory 150 has ownership of DQ. After making this determination, non-volatile memory 150 may send the response to NMI 146 via DQ, such as described above.

At block 870, an indication may be sent that indicates that the response is no longer being sent on the bus. For example, non-volatile memory 150 may send a post-amble on DQS to indicate that the response is no longer being sent on DQ.

At block 880, an indication may be acquired that indicates ownership of the bus is no longer granted to the client. For example, NMI 146 may deassert RGRANT to indicate to non-volatile memory 150 that non-volatile memory 150 no longer has ownership of DQ. Non-volatile memory 150 may detect that RGRANT is no longer asserted and determine that the non-volatile memory 150 no longer has ownership of DQ.

Figure 9:
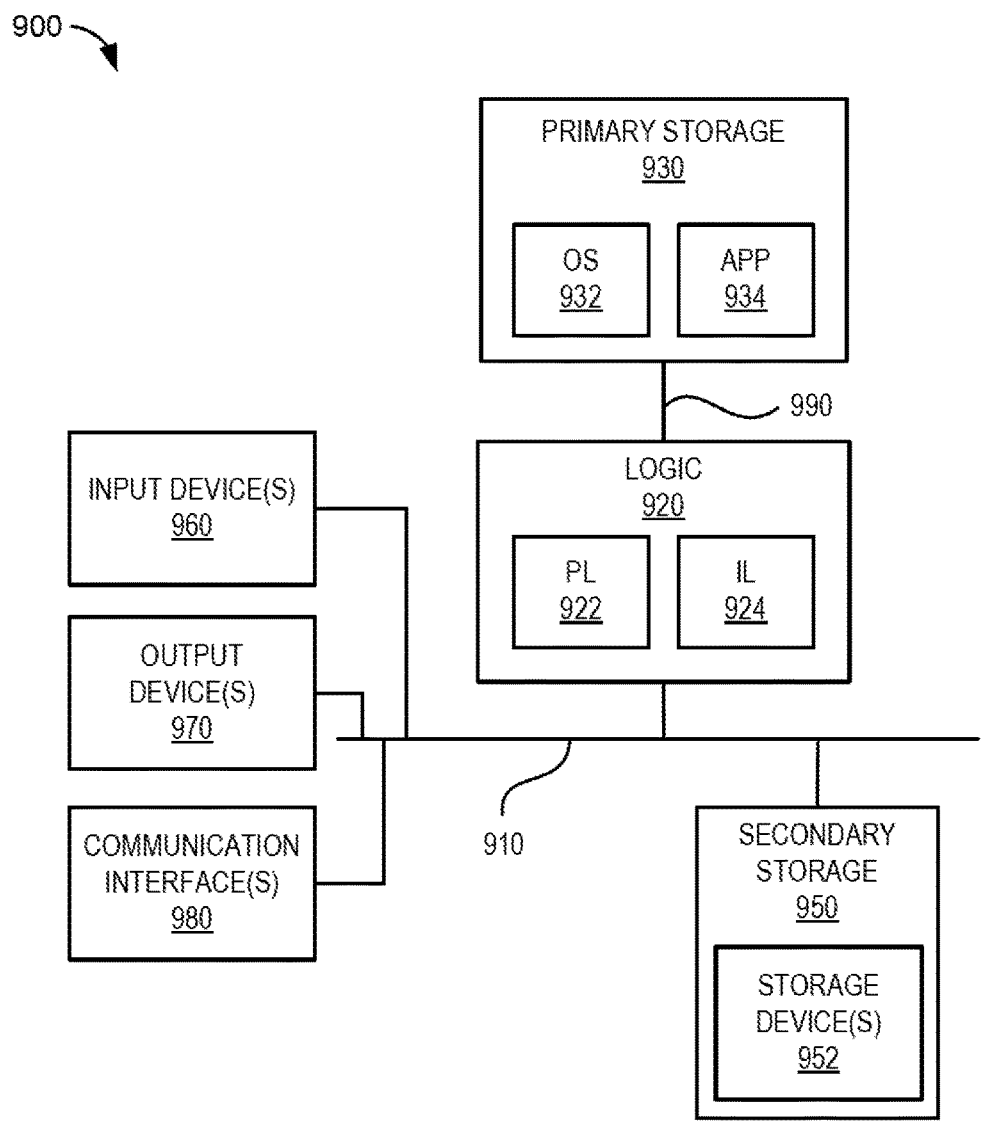
FIG. 9 illustrates a block diagram of another example of a computing device.

FIG. 9 illustrates a block diagram of another example embodiment of a computing device 900 that may implement techniques described herein. Referring to FIG. 9, computing device 900 may include various components such as, for example, logic 920, primary storage 930, secondary storage 950, one or more input devices 960, one or more output devices 970, and/or one or more communication interfaces 980.

It should be noted that FIG. 9 illustrates an example embodiment of computing device 900. Other embodiments of computing device 900 may include more components or fewer components than the components illustrated in FIG. 9. Further, the components may be arranged differently than as illustrated in FIG. 9.

For example, in an embodiment of computing device 900, secondary storage 950 may be contained at a remote site that provides "cloud" storage. The site may be accessible to computing device 900 via a communications network, such as, for example, the Internet. A communication interface 980 may be used to interface the computing device 900 with the communications network.

Also, it should be noted that features provided by various components contained in other embodiments of computing device 900 may be distributed among the components differently than as described herein.

Computing device 900 may include an input/output (I/O) bus 910 that may enable communication among components in computing device 900. The components may include, for example, logic 920, secondary storage 950, one or more input devices 960, one or more output devices 970, and/or one or more communication interfaces 980. The communication may involve, for example, transferring control signals and/or data between the components via I/O bus 910. I/O busses that may be used to implement I/O bus 910 may include, for example, serial AT attachment (SATA), peripheral component interconnect (PCI), PCI express (PCI-e), universal serial bus (USB), small computer system interface (SCSI), serial attached SCSI (SAS), or some other I/O bus.

Input devices 960 may include one or more devices that may be used to input information into computing device 900. The devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, steering wheel, yoke, jog dial, space ball, directional pad, dance pad, soap mouse, haptic device, tactile device, neural device, multi-point input device, discrete pointing device, and/or some other input device.

The information may include spatial (e.g., continuous, multi-dimensional) data that may be input into computing device 900 using, for example, a pointing device, such as a computer mouse. The information may also include other forms of data, such as, for example, text that may be input using a keyboard.

Output devices 970 may include one or more devices that may output information from computing device 900. The devices may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, touch screen, and/or some other output device.

Output devices 970 may be directed by, for example, logic 920, to output the information from computing device 900. Outputting information on an output device 970 may include, for example, presenting (e.g., displaying, printing) the information on the output device 970. The information may include, for example, text, graphical user interface (GUI) elements (e.g., windows, widgets, and/or other GUI elements), audio (e.g., music, sounds), and/or other information that may be outputted by output devices 970.

Communication interfaces 980 may include logic for interfacing computing device 900 with, for example, one or more communications networks and enable computing device 900 to communicate with one or more entities (e.g., nodes) coupled to the communications networks. The communications networks may include, for example, the Internet, wide-area networks (WANs), local area networks (LANs), 3G and/or 4G (e.g., 4G long-term evolution (LTE)) networks.

Communication interfaces 980 may include one or more transceiver-like mechanisms that may enable computing device 900 to communicate with entities coupled to the communications networks. Examples of communication interfaces 980 may include a built-in network adapter, network interface card (NIC), Personal Computer Memory Card International Association (PCMCIA) network card, card bus network adapter, wireless network adapter, Universal Serial Bus (USB) network adapter, modem, and/or other device suitable for interfacing computing device 100 to a communications network.

Primary storage 930 and/or secondary storage 950 may include one or more storage modules such as, for example, storage modules described above. Computing device 900 may include a memory bus 990 that may enable information stored in primary storage 930, to be transferred between logic 920 and primary storage 930. The information may include, for example, computer-executable instructions and/or data that may be executed, manipulated, and/or otherwise processed by logic 920.

Primary storage 930 may be accessible to logic 920 via memory bus 990. Primary storage 930 may be a tangible non-transitory storage that may store information. The information may include computer-executable instructions and/or data that may implement operating system (OS) 932 and application (APP) 934 or parts thereof. The information may be executed, interpreted, manipulated, and/or otherwise processed by logic 920. Primary storage 930 may be implemented using one or more memory devices that may store the information. The memory devices may include volatile and/or non-volatile memory devices such as described above.

OS 932 may be a conventional operating system that may implement various conventional operating system functions that may include, for example, (1) scheduling one or more portions of APP 934 to run on (e.g., be executed by) the logic 920, (2) managing primary storage 930, and (3) controlling access to various components in computing device 900 (e.g., input devices 960, output devices 970, communication interfaces 980, secondary storage 950) and information received and/or transmitted by these components.

Examples of operating systems that may be used to implement OS 932 may include the Linux operating system, Microsoft Windows operating system, the Symbian operating system, Mac OS operating system, and the Android operating system. A distribution of the Linux operating system that may be used is Red Hat Linux available from Red Hat Corporation, Raleigh, N.C. Versions of the Microsoft Windows operating system that may be used include Microsoft Windows Mobile, Microsoft Windows 8, Microsoft Windows 7, Microsoft Windows Vista, and Microsoft Windows XP operating systems available from Microsoft Inc., Redmond, Wash. The Symbian operating system is available from Accenture PLC, Dublin, Ireland. The Mac OS operating system is available from Apple, Inc., Cupertino, Calif. The Android operating system is available from Google, Inc., Menlo Park, Calif.

APP 934 may be a software application that may execute under control of OS 932 on computing device 900. APP 934 and/or OS 932 may contain provisions for processing transactions that may involve storing information in secondary storage 950. These provisions may be implemented using data and/or computer-executable instructions contained in APP 934 and/or OS 932.

Secondary storage 950 may be a tangible non-transitory storage that may store information for computing device 900. The information may include, for example, computer-executable instructions and/or data. The information may be executed, interpreted, manipulated, and/or otherwise processed by logic 920.

Secondary storage may include one or more storage devices 952 that may store the information. The storage devices 952 may be accessible to logic 920 via I/O bus 910. The storage devices 952 may be volatile or non-volatile. Examples of storage devices 952 may include magnetic disk drives, optical disk drives, random-access memory (RAM) disk drives, flash drives, solid-state disks (SSDs), and/or hybrid drives. The information may be stored on one or more tangible non-transitory computer-readable media contained in the storage devices 952. Examples of tangible non-transitory tangible computer-readable media that may be contained in the storage devices may include magnetic discs, optical discs, volatile memory devices, and/or non-volatile memory devices.

Logic 920 may include processing logic (PL) 924 for interpreting, executing, and/or otherwise processing information. The information may include information that may be stored in primary storage 930 and/or secondary storage 950. In addition, the information may include information that may be acquired (e.g., read, received) by one or more input devices 960 and/or communication interfaces 980.

PL 924 may include a variety of heterogeneous hardware. For example, the hardware may include some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), and/or other types of processing logic that may, for example, interpret, execute, manipulate, and/or otherwise process the information. Logic 920 may comprise a single core or multiple cores.

Logic 920 may also include interface logic (IL) 924 that may interface processing logic with primary storage 930. IL 924 may include provisions for transferring information to be transferred between primary storage 930 and logic 920 via bus 990. The information may be transferred utilizing various techniques, such as techniques described above.

For example, in an embodiment, primary storage 930 may include non-volatile memory that may be accessible to logic 920 via bus 990. IL 924 may contain logic that may be used to communicate information between the non-volatile memory contained in primary storage 930 and PL 924 via bus 990 using various techniques, such as techniques described above. The logic may contained in IL 924 may include, for example, state machines, bus transceivers, registers, and/or other logic that may be used to enable the transfer of the information between the non-volatile memory and PL 924. The information may include, for example, requests and/or data, such as described above.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 5A-B, 6A-B, 7A-B, and 8A-B, the order of the acts may be modified in other implementations. Further, non-dependent acts may be performed in parallel.

Also, the term "user", as used herein, is intended to be broadly interpreted to include, for example, a computing device (e.g., fixed computing device, mobile computing device) or a user of a computing device, unless otherwise stated.

It will be apparent that one or more embodiments, described herein, may be implemented in many different forms of software and/or hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain features of the invention may be implemented using computer-executable instructions that may be executed by processing logic, such as, for example, processing logic 130 or processing logic 922. The computer-executable instructions may be stored on one or more non-transitory tangible computer-readable storage media. The media may be volatile or non-volatile and may include, for example, DRAM, SRAM, flash memories, removable disks, non-removable disks, and so on.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:
    sending an indication that a request is being sent to a non-volatile memory via a bus between a memory interface for a processor and the non-volatile memory;
    sending the request to the non-volatile memory via the bus, the request including a preamble for use by the non-volatile memory to prepare to acquire the request via the bus;
    sending the request to the non-volatile memory via the bus, the request also including an address for identifying a location in the non-volatile memory containing data to be read;
    acquiring an indication via the bus that the non-volatile memory is ready to send information associated with the request;
    sending an indication via the bus that access to the bus has been granted to the non-volatile memory; and
    receiving the information from the non-volatile memory via the bus, the information including the data.

2. The method of claim 1, the request includes a command that indicates that a read transaction is to be performed to read the data from the location in the non-volatile memory.

3. The method of claim 1, further comprising:
    acquiring a strobe signal from logic at the non-volatile memory via the bus; and
    receiving the information from the bus using the acquired strobe signal.

4. The method of claim 1, comprising the bus including a plurality of wires, sending the request to the non-volatile memory and receiving the information from the non-volatile memory on a same wire of the plurality of wires.

5. The method of claim 1, further comprising:
    acquiring an indication from the bus that the information from the non-volatile memory is no longer being sent via the bus.

6. The method of claim 5, the indication that the information from the non-volatile memory is no longer being sent via the bus includes a post-amble.

7. The method of claim 6, sending, based on the post-amble, an indication via the bus that access is no longer granted to the non-volatile memory.

8. The method of claim 6, comprising the bus including a plurality of wires, receiving the information from the non-volatile memory on a first wire of the plurality of wires and the indication that the information from non-volatile memory is no longer being sent via the bus is acquired on a second wire of the plurality of wires.

9. The method of claim 1, the non-volatile memory comprises one or more of a flash memory device, a ferroelectric transistor random access memory (FeTRAM) memory device, a magneto-resistive random access memory (MRAM) memory device, a phase change memory device, a resistive random access memory (RRAM) memory device, or a spin transfer torque (STT) MRAM memory device.

10. A method comprising:
    sending an indication that a request is being sent to a non-volatile memory via a bus between a memory interface for a processor and the non-volatile memory;
    sending the request to the non-volatile memory via the bus, the request including a preamble for use by the non-volatile memory to prepare to acquire the request from the bus;

sending the request to the non-volatile memory via the bus, the request also including an address for use in identifying a location in the non-volatile memory to be written;

sending data to be written to the non-volatile memory via the bus;

sending a strobe signal to the non-volatile memory via the bus for the non-volatile memory to use to acquire the data to be written to the location in the non-volatile memory; and sending an indication via the bus to the non-volatile memory that the sending of the data to be written to the location in the non-volatile memory via the bus is complete.

11. The method of claim 10, comprising the bus including a plurality of wires, receiving the request and sending the data on a same wire from among the plurality of wires.

12. The method of claim 10, the request includes a command that indicates that a write transaction is to be performed to write the data to the location in the non-volatile memory.

13. The method of claim 10, the indication that sending of the data to be written to the location in the non-volatile memory via the bus is complete is based on information included in a post-amble.

14. The method of claim 10, comprising the bus including a plurality of wires, sending the data to be written to the location in the non-volatile memory on a first wire of the plurality of wires and sending the indication that the sending of the data to be written to the location in the non-volatile memory via the bus is complete on a second wire of the plurality of wires.

15. The method of claim 10, further comprising:
acquiring an indication via the bus that the non-volatile memory is ready to send a response to the request;
sending an indication via the bus that access to the bus has been granted to the non-volatile memory;
receiving information from the non-volatile memory via the bus, the information including a preamble for use by the memory interface to prepare to acquire the response to the request via the bus; and
receiving the response to the request via the bus.

16. The method of claim 15, the response to the request comprising an indication of whether the request was successful.

17. The method of claim 10, the non-volatile memory comprises one or more of a flash memory device, a ferro-electric transistor random access memory (FeTRAM) memory device, a magneto-resistive random access memory (MRAM) memory device, a phase change memory device, a resistive random access memory (RRAM) memory device, or a spin transfer torque (STT) MRAM memory device.

18. An apparatus comprising:
a bus coupled with a non-volatile memory; and
a memory interface coupled with the bus, the memory interface to include logic to:
send an indication that a request is to be sent to the non-volatile memory via the bus;
send the request to the non-volatile memory via the bus, the request to include a preamble for use by the non-volatile memory to prepare to acquire the request via the bus;
send the request to the non-volatile memory via the bus, the request to also include an address to identify a location in the non-volatile memory that contains data to be read;
acquire an indication via the bus that the non-volatile memory is ready to send information associated with the request;
send an indication via the bus that access to the bus has been granted to the non-volatile memory; and
receive the information from the non-volatile memory via the bus, the information to include the data.

19. The apparatus of claim 18, the request includes a command that indicates that a read transaction is to be performed to read the data from the location in the non-volatile memory.

20. The apparatus of claim 18, further comprising the logic to:
acquire a strobe signal from the non-volatile memory via the bus; and
receive the information from the bus via use of the acquired strobe signal.

21. The apparatus of claim 18, comprising the bus to include a plurality of wires, the logic to send the request to the non-volatile memory and receive the information from the non-volatile memory on a same wire of the plurality of wires.

22. The apparatus of claim 18, further comprising the logic to:
acquire an indication from the bus that the information from the non-volatile memory is no longer being sent via the bus.

23. The apparatus of claim 22, the indication that the information from the non-volatile memory is no longer being sent via the bus includes a post-amble.

24. The apparatus of claim 23, the logic to send, based on the post-amble, an indication via the bus that access is no longer granted to the non-volatile memory.

25. The apparatus of claim 24, comprising the bus to include a plurality of wires, the logic to receive the information from the non-volatile memory on a first wire of the plurality of wires and the indication that the information from non-volatile memory is no longer being sent via the bus is acquired by the logic on a second wire of the plurality of wires.

26. The apparatus of claim 18, the non-volatile memory comprises one or more of a flash memory device, a ferro-electric transistor random access memory (FeTRAM) memory device, a magneto-resistive random access memory (MRAM) memory device, a phase change memory device, a resistive random access memory (RRAM) memory device, or a spin transfer torque (STT) MRAM memory device.

27. The apparatus of claim 18, further comprising:
a processor; and
the memory interface included in a host controller, the host controller to enable information to be exchanged between the processor and the non-volatile memory through the memory interface.

* * * * *